United States Patent [19]

Metzigian

[11] 4,383,365

[45] May 17, 1983

[54] EGG SLICER WITH INTERCHANGEABLE COMPONENTS

[76] Inventor: Michael J. Metzigian, 10 Haverhill Ct., Ann Arbor, Mich. 48105

[21] Appl. No.: 269,269

[22] Filed: Jun. 1, 1981

[51] Int. Cl.[3] .................... A21C 5/08

[52] U.S. Cl. .................... 30/114; 30/117; 30/303; 30/304

[58] Field of Search .................... 30/114, 116, 117, 115, 30/299, 301, 302, 303, 304, 305

[56] References Cited

U.S. PATENT DOCUMENTS

| | | | |
|---|---|---|---|
| D. 85,385 | 10/1931 | Lowitz | 30/304 |
| 1,043,472 | 11/1912 | Shaw | 30/117 |
| 1,299,802 | 4/1919 | Smith | 30/301 |
| 1,582,103 | 4/1926 | Vitullo | 30/304 |
| 1,614,282 | 1/1927 | Cleary | 30/304 |
| 1,656,415 | 1/1928 | Breitkrentz | 30/303 |
| 1,679,004 | 7/1928 | Pinkel et al. | 30/116 |
| 1,798,551 | 3/1931 | Mocking et al. | 30/115 |
| 1,910,380 | 5/1933 | Daum | 30/304 |
| 2,023,706 | 12/1935 | Smith | 30/117 |
| 2,186,429 | 1/1940 | Reinwald | 30/304 |
| 2,709,298 | 5/1955 | Mater | 30/304 |
| 2,716,814 | 9/1955 | Lerner | 30/115 |
| 4,000,395 | 12/1976 | Fischer | 30/116 |
| 4,055,892 | 11/1977 | Del Vecchio | 30/305 |

FOREIGN PATENT DOCUMENTS

| | | | |
|---|---|---|---|
| 2345930 | 10/1977 | France | 30/117 |
| 8857 | of 1910 | United Kingdom | 30/116 |

*Primary Examiner*—James G. Smith

*Assistant Examiner*—J. T. Zatarga

[57] ABSTRACT

This device is a combination device, for slicing eggs, stick butter, soft cheeses and other foods, and it consists primarily of interchangeable cutting blades and food support members, the support members being slideable in the base of the device. It further consists of a pivotal frame secured to one end of the base, that has a provision for receiving different slicing or cutting blades, for adaptation to their respective food support members.

4 Claims, 8 Drawing Figures

FIG. 1
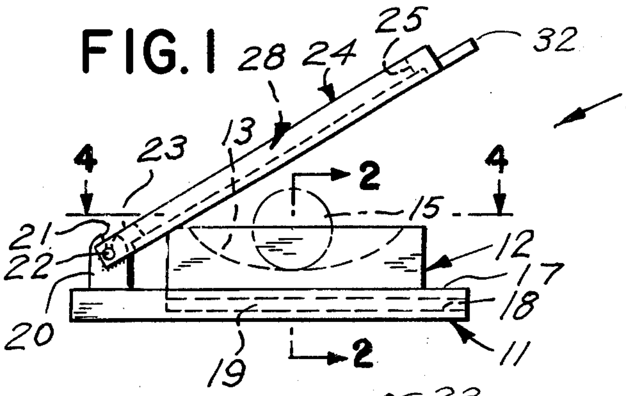
FIG. 2
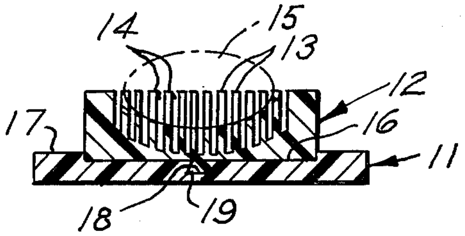
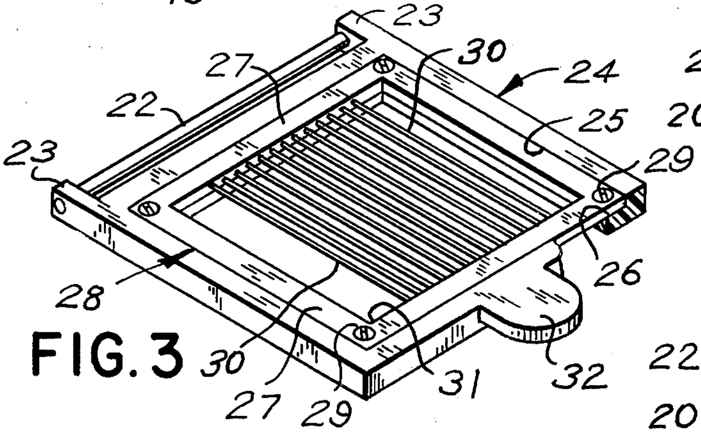
FIG. 3
FIG. 4
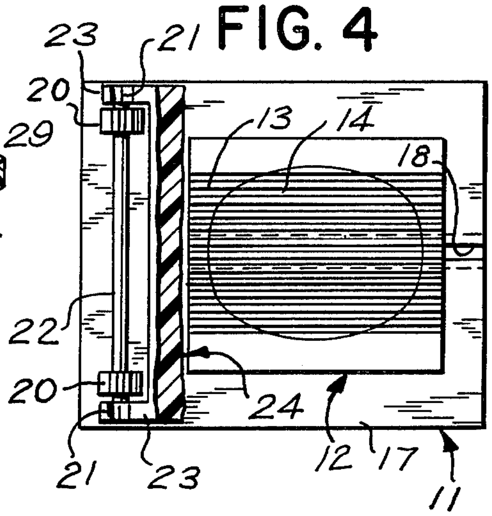
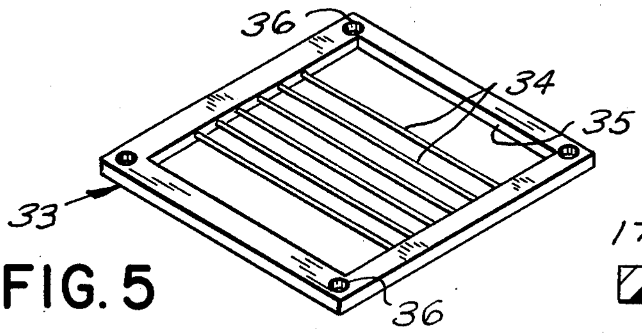
FIG. 5
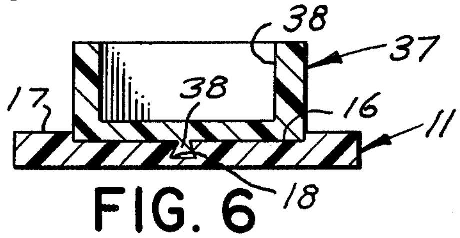
FIG. 6
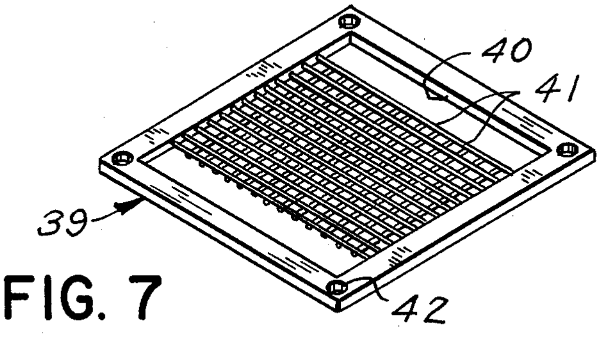
FIG. 7
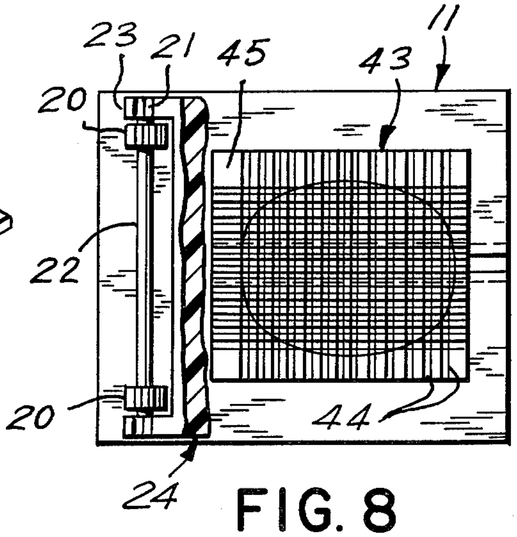
FIG. 8

EGG SLICER WITH INTERCHANGEABLE COMPONENTS

This invention relates to food slicing devices, and more particularly, to an egg slicer with interchangeable components.

It is, therefore, the principal object of this invention to provide an egg slicer with interchangeable components, which will enable the device to slice eggs, butter, etc.

Another object of this invention is to provide an egg slicer with interchangeable components, which will enable the user to change the components quickly and easily, when desired.

Another object of this invention is to provide an egg slicer with interchangeable components, which will be of such structure, as to have the blades and food holding portions removable therefrom.

A further object of this invention is to provide an egg slicer with interchangeable components, which will be safe in use.

Other objects are to provide an egg slicer with interchangeable components, which is simple in design, inexpensive to manufacture, rugged in construction, easy to use, and efficient in operation.

These, and other objects, will be readily evident, upon a study of the following specification, and the accompanying drawing, wherein:

FIG. 1 is a side elevational view of the present invention, showing the pivotal member in a partially raised position;

FIG. 2 is a cross-sectional view, taken along the line 2—2 of FIG. 1, and illustrates an egg in phantom;

FIG. 3 is a fragmentary perspective view of the pivotal blade holding frame, shown removed from FIG. 1;

FIG. 4 is a cross-sectional view, taken along the line 4—4 of FIG. 1;

FIG. 5 is a perspective view of a blade of modified construction, for use in the blade frame member of FIG. 3;

FIG. 6 is a cross-sectional view, similar to FIG. 2, but illustrating the removable base component, for use with the structure of FIG. 5;

FIG. 7 is a perspective view of another modified and removable blade, for use in the frame of FIG. 3, and FIG. 8 is similar to FIG. 4, but illustrates another modified and removable base component, for use with the blade of FIG. 7.

According to this invention, device 10 is shown to include a rectangular plastic base 11, for removably receiving a plastic support member 12, having a plurality of equally spaced-apart lands 13 and grooves 14, which are recessed for supporting an egg 15, to be sliced. A recessed groove 16, in the top surface 17 of base 11, slideably receives support member 12, and a dove-tail groove 18, in base 11, slideably receives a dove-tail rail 19, integral with the bottom of support member 12. A pair of spaced-apart posts 20 are fixedly secured to surface 17, at the rear of member 12, in a suitable manner, and are grooved with an angularly-shaped notch 21, for snapably receiving hinge pin 22, fixedly secured in legs 23, extending from the rear of frame 24. Frame 24 includes a rectangular opening 25, having a rectangular and inwardly projecting shoulder 26, upon which the sides 27 of blade member 28 rest. The blade member 28 is secured to the shoulder 26, by means of a plurality of screw fasteners 29. A plurality of equally spaced-apart steel wires 30 are fixedly secured, at each end, across the opening 31 in the blade member 28, by suitable means (not shown), and a lip 32 extends from, and is integral with, the forward center portion of frame 24, for operating device 10.

In use, an egg 15 is placed within the support member 12, and frame 24 is pivoted downwards, by means of the lip 32, which causes the egg 15 to be sliced by the wires 30, that travel into the grooves 14 of support member 12. When egg 15 has been sliced, the frame 24 is pivoted upwards, by the user lifting the lip 32, and the sliced egg 15 is then removed from device 10.

It shall be noted, that, in the event that blade member 28 breaks, it can easily be replaced by a similar one, by removing the screw fasteners 29.

Referring now to FIGS. 5 and 6 of the drawing, a modified blade member 33 is shown to include a plurality of centrally positioned and equally spaced-apart wires 34, that are fixedly secured across the opening 35, but are further spaced-apart than those described of FIG. 3, so as to slice sticks of butter, cream cheese, and the like. A rectangular support member 37, of plastic material, includes a top opening 38, for receiving the cut slices, and support member 37 includes a dove-tail rail 38 on its bottom, for being interchangeable with the support member 12 of FIGS. 1 and 2.

In use, the blade member 28 is removed from frame 24 by removing fasteners 29, and blade member 33 is put in its place, and secured by the fasteners 29. The support member 12 is also removed by sliding it out of base 11, and the support member 37 is slid into place on base 11, the blade member 33 being used in the same manner, as was heretofore described of device 10.

Looking now at FIGS. 7 and 8 of the drawing, a further modified form of blade member 39 includes criss-crossed wire members 41, which form a grate for producing small pieces of boiled egg, for making egg salad. Blade member 39 also includes openings 42, for receiving screw fasteners to attach it to the aforementioned frame 24. A support member 43, for use with blade member 39, includes a plurality of criss-crossed grooves 44 in its top surface 45, so as to receive the wire members 41 of blade member 39, and support member 43 is also slideable within base 11, as was heretofore described of 12 and 37.

In use, blade member 39 and support member 43 are used in the same manner, as described of 33, 12, 37, and 39.

While various changes may be made in the detail construction, it is understood that such changes will be within the spirit and scope of the present invention, as is defined by the appended claims.

What I now claim is:

1. An egg slicer with interchangeable components, comprising, in combination, a base, a plurality of interchangeable support members selectively mounted upon said base, said base including dove tail means and a recess thereupon for seating a selected said support member, each one of said support members being specifically shaped upon its upper side for supporting a particular article of food to be sliced, and a frame snapped at one end in notched legs formed on one end of said base, said frame being pivotable thereon for swinging down across said selected support member, and said frame having a central opening fitted with an interchangeable, frame-shaped blade member having a wire grid affixed therein, that selectively mates with said selected suppport member.

2. The combination as set forth in claim 1, wherein a mating set of said support member and said wire grid, for slicing an egg, includes said suppport member having a depression upon its upper side for retaining said egg during an egg slicing operation, and a plurality of parallel, spaced-apart grooves extending deeper into said support member than said depression, and includes said wire grid comprising a plurality of parallel, spaced-apart wires receivable in said grooves.

3. The combination as set forth in claim 1, wherein another mating set of said support member and said wire grid, for cross-slicing an egg, includes said support member having a depression upon its upper side for retaining said egg during an egg cross-slicing operation, and two groups of parallel, spaced-apart grooves, one said group being at right angles to and crossing the other said group, and all said grooves extending deeper into said support member than said depression, and said wire grid comprising two groups of crossing wires receivable in said crossing grooves.

4. The combination as set forth in claim 1, wherein another mating set of said support member and said wire grid, for slicing a bar of cheese or butter, includes said support member having a top opening for placement of said bar therein, and said wire grid comprising a plurality of parallel, spaced-apart wires.

* * * * *